United States Patent
Kondo (10) Patent No.: US 7,770,382 B2
(45) Date of Patent: Aug. 10, 2010

(54) SECONDARY AIR SUPPLY SYSTEM AND ABNORMALITY DETECTION METHOD FOR SECONDARY AIR SUPPLY SYSTEM

(75) Inventor: Shinya Kondo, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1030 days.

(21) Appl. No.: 11/504,057

(22) Filed: Aug. 15, 2006

(65) Prior Publication Data
US 2007/0039312 A1   Feb. 22, 2007

(30) Foreign Application Priority Data
Aug. 22, 2005   (JP)   ............... 2005-240377

(51) Int. Cl.
*F01N 3/00*   (2006.01)
(52) U.S. Cl. ............... 60/277; 60/276; 60/289
(58) Field of Classification Search ........... 60/276, 60/277, 289
See application file for complete search history.

(56) References Cited

U.S. PATENT DOCUMENTS 4,216,653 A * 8/1980 Nakase et al. ............... 60/276
5,560,199 A * 10/1996 Agustin et al. ............... 60/274
2005/0120711 A1 * 6/2005 Koyama et al. ............... 60/289

FOREIGN PATENT DOCUMENTS

| JP | A 06-146867 | 5/1994 |
| JP | A 2003-083048 | 3/2003 |
| JP | A 2003-314263 | 11/2003 |
| JP | A 2005-009385 | 1/2005 |

* cited by examiner

*Primary Examiner*—Thomas E. Denion
*Assistant Examiner*—Audrey Klasterka
(74) *Attorney, Agent, or Firm*—Oliff & Berridge, PLC (57) ABSTRACT

During secondary air supply control, a secondary air supply system which supplies secondary air to an upstream side of an exhaust gas control apparatus obtains a secondary air flow rate supplied to an exhaust passage provided independently for each of a plurality of cylinder groups, and detects an abnormality in the secondary air supply system based on a noxious substance amount in exhaust gas discharged from the exhaust passages which is determined from the obtained secondary air flow rates.

8 Claims, 6 Drawing Sheets

SECONDARY AIR SUPPLY SYSTEM AND ABNORMALITY DETECTION METHOD FOR SECONDARY AIR SUPPLY SYSTEM

INCORPORATION BY REFERENCE

The disclosure of Japanese Patent Application No. 2005-240377 filed on Aug. 22, 2005, including the specification, drawings and abstract is incorporated herein by reference in its entirety.

BACKGROUND OF THE INVENTION

1. Field of the Invention

The invention relates to a secondary air supply system and an abnormality detection method for a secondary air supply system. More specifically, the invention relates to a secondary air supply system which supplies secondary air to each exhaust passage of an internal combustion engine that includes an independent exhaust passage for each cylinder group, as well as an abnormality detection method for a secondary air supply system.

2. Description of the Related Art

An internal combustion engine mounted in a vehicle such as a passenger car or a truck is typically provided with an exhaust gas control apparatus in an exhaust passage of the engine. This exhaust gas control apparatus has a three way catalyst or the like which reduces noxious substances such as CO, HC, and NOx in the exhaust gas. The performance with which this exhaust gas control apparatus purifies these kinds of noxious substances in the exhaust gas improves as the operating temperature rises. Therefore, when the operating temperature is low such as during a cold start of the internal combustion engine, the exhaust gas control apparatus may not be able to sufficiently reduce the noxious substances in the exhaust gas.

Therefore, conventional engines are provided with a secondary air supply system which supplies an oxidizing gas, in this case secondary air, to the upstream side of the exhaust gas control apparatus in the exhaust passage. Supplying secondary air to the exhaust pipe on the upstream side of the exhaust gas control apparatus during a cold start of the internal combustion engine, for example, using this secondary air supply system increases the oxygen concentration of the exhaust gas passing through that exhaust pipe. This increased oxygen concentration promotes the oxidation of noxious substances (in this case CO and HC) in the exhaust gas, thereby reducing the noxious substances in the exhaust gas.

If there is an abnormality in the secondary air supply system, e.g., if a secondary air supply line that introduces the secondary air into the exhaust pipe becomes clogged or a secondary air supply pump that supplies the secondary air to the exhaust pipe via this secondary air supply line fails, for example, the air flow rate of the secondary air supplied to the exhaust passage decreases. As a result, the noxious substances in the exhaust gas are not suppressed without oxidation of noxious substances (in this case CO and HC) in the exhaust gas being promoted, which may result in a deterioration of emissions. Therefore, technology for detecting an abnormality in a secondary supply system in a conventional internal combustion engine has been proposed.

Japanese Patent Application Publication No. JP-A-2003-83048, for example, describes technology in which a pressure sensor is arranged in a secondary air supply passage which supplies secondary air. This technology detects an abnormality in the secondary air supply system based on a pressure value detected by this pressure sensor and a pressure fluctuation value.

Some internal combustion engines such as horizontally-opposed engine or V-type engines have a plurality of cylinder groups made up of at least one or more cylinders. Some of these internal combustion engines having such a plurality of cylinder groups have an independent exhaust passage provided for each group of cylinders. In internal combustion engines having an independent exhaust passage provided for each group of cylinders, the secondary air supply system described above supplies secondary air to each of the exhaust passages on the upstream side of the exhaust gas control apparatuses provided in the exhaust passages.

Figure 8:
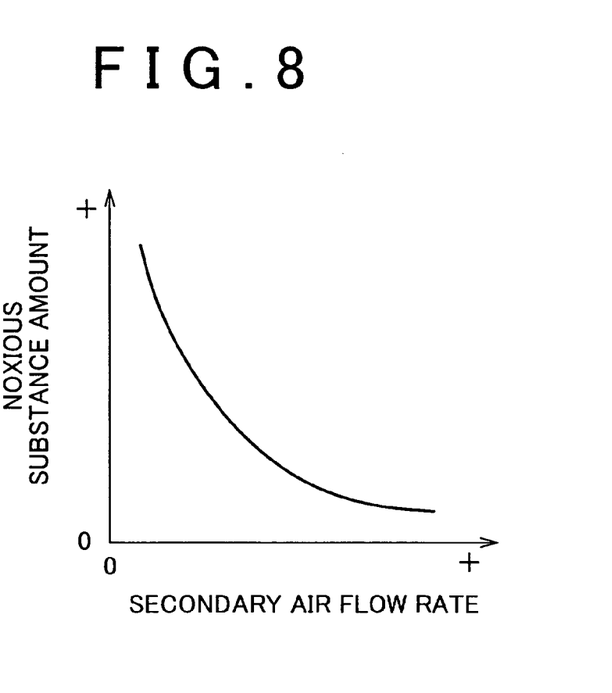
FIG. 8 is a graph showing the relationship between secondary air flow rate and the amount of noxious substances.

FIG. 8 is a graph showing the relationship between the secondary air flow rate and the amount of noxious substances. As shown in the drawing, the secondary air flow rate supplied to the exhaust passage and the amount of noxious substances in the exhaust gas discharged outside of the internal combustion engine from the exhaust passage are not proportional to one another. Rather, the amount of noxious substances noticeably increases in a quadratic curve as the secondary air flow rate decreases. Accordingly, in a secondary air supply system provided in a conventional engine having a plurality of cylinder groups, even if the total air flow rate of the combined secondary air flow rates supplied to the exhaust passages is the same, if the percentages of the secondary air flow rates supplied to the exhaust passages are different, it will cause the total amount of noxious substances, which is the combined amount of the noxious substances in the exhaust gas discharged outside of the internal combustion engine from the exhaust passages, to change. That is, if an abnormality in the secondary air supply system is detected based only on the total air flow rate of the secondary air in a conventional internal combustion engine having a plurality of cylinder groups, that detection accuracy will be low.

SUMMARY OF THE INVENTION

This invention provides a secondary air supply system and an abnormality detection method for a secondary air supply system capable of accurately detecting an abnormality.

Therefore, a first aspect of the invention relates to a secondary air supply system which supplies secondary air to an upstream side of an exhaust gas control apparatus, which includes an exhaust passage provided independently for each of a plurality of cylinder groups made up of at least one cylinder; a secondary air flow rate obtaining device which obtains a secondary air flow rate of the secondary air supplied to each of the exhaust passages; a noxious substance amount calculating device which calculates a noxious substance amount in exhaust gas discharged from each of the exhaust passages according to each obtained secondary air flow rate; and an abnormality detecting device which detects an abnormality in the secondary air supply system when a total noxious substance amount that is the sum of the calculated noxious substance amounts is equal to or greater than a predetermined total noxious substance amount.

Further, a second aspect of the invention relates to an abnormality detection method for a secondary air supply system which supplies secondary air to an upstream side of an exhaust gas control apparatus. This abnormality detection method includes the steps of obtaining a secondary air flow rate of secondary air supplied to an exhaust passage provided independently for each of a plurality of cylinder groups made up of at least one cylinder; calculating a noxious substance amount in exhaust gas discharged from each of the exhaust passages according to each obtained secondary air flow rate; and detecting an abnormality in the secondary air supply system when a total noxious substance amount that is the sum of the calculated noxious substance amounts is equal to or greater than a predetermined total noxious substance amount.

According to these aspects of the invention, the noxious substance amounts in the exhaust gas discharged from the exhaust passages are calculated from the secondary air amounts supplied to the exhaust passages, and an abnormality in the secondary air supply system is then detected based on the total noxious substance amount that is the sum of the calculated noxious substance amounts. As a result, an abnormality in the secondary air supply system can be detected more accurately than it can be when abnormality detection is based on the total flow rate of the combined secondary air flow rates supplied to the exhaust passages because the change in the noxious substance amounts in the exhaust gas discharged from the internal combustion engine can be accurately estimated.

Also, a third aspect of the invention relates to a secondary air supply system which supplies secondary air to an upstream side of an exhaust gas control apparatus, which includes an exhaust passage provided independently for each of a plurality of cylinder groups made up of at least one cylinder; a secondary air flow rate obtaining device which obtains a secondary air flow rate of the secondary air supplied to each of the exhaust passages; a predetermined secondary air flow rate calculating device which calculates, based on one of the obtained secondary air flow rates, the other predetermined secondary air flow rate in which a total noxious substance amount of combined noxious substance amounts in exhaust gas discharged from the exhaust passages becomes a predetermined total noxious substance amount; and an abnormality detecting device which detects an abnormality in the secondary air supply system when the other secondary air flow rate that was obtained is equal to or less than the other predetermined secondary air flow rate that was calculated.

Also, a fourth aspect of the invention relates to an abnormality detection method for a secondary air supply system which supplies secondary air to an upstream side of an exhaust gas control apparatus. This abnormality detection method includes the steps of obtaining a secondary air flow rate of secondary air supplied to an exhaust passage provided independently for each of a plurality of cylinder groups made up of at least one cylinder; calculating, based on one of the obtained secondary air flow rates, the other predetermined secondary air flow rate in which a total noxious substance amount of combined noxious substance amounts in exhaust gas discharged from the exhaust passages becomes a predetermined total noxious substance amount; and detecting an abnormality in the secondary air supply system when the other secondary air flow rate that was obtained is equal to or less than the other predetermined secondary air flow rate that was calculated.

According to these aspects of the invention, an abnormality in the secondary air supply system is detected based on the other predetermined secondary air flow rate that was calculated from one of the secondary air flow rates supplied to the exhaust passages when the total noxious substance amount, which is the combined noxious substance amounts in the exhaust gas discharged from the exhaust passages, is made the predetermined total noxious substance amount. As a result, an abnormality in the secondary air supply system can be detected more accurately than it can be when abnormality detection is based on the total flow rate of the combined secondary air flow rates supplied to the exhaust passages because the change in the noxious substance amounts in the exhaust gas discharged from the internal combustion engine can be accurately estimated.

With the secondary air supply system and abnormality detection method for a secondary air supply system according to these aspects of the invention, an abnormality is detected based on the noxious substance amount included in the exhaust gas discharged from each of the exhaust passages, which is calculated from the secondary air flow supplied to each of the exhaust passages. As a result, an abnormality in the secondary air supply system can be accurately detected.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

In the following description and the accompanying drawings, the present invention will be described in more detail in terms of exemplary embodiments. It is to be understood, however, that the invention is not limited to the following example embodiments. Moreover, the structural elements in the following example embodiments include those that are essentially the same or those which can easily be anticipated by one skilled in the art.

Figure 1:
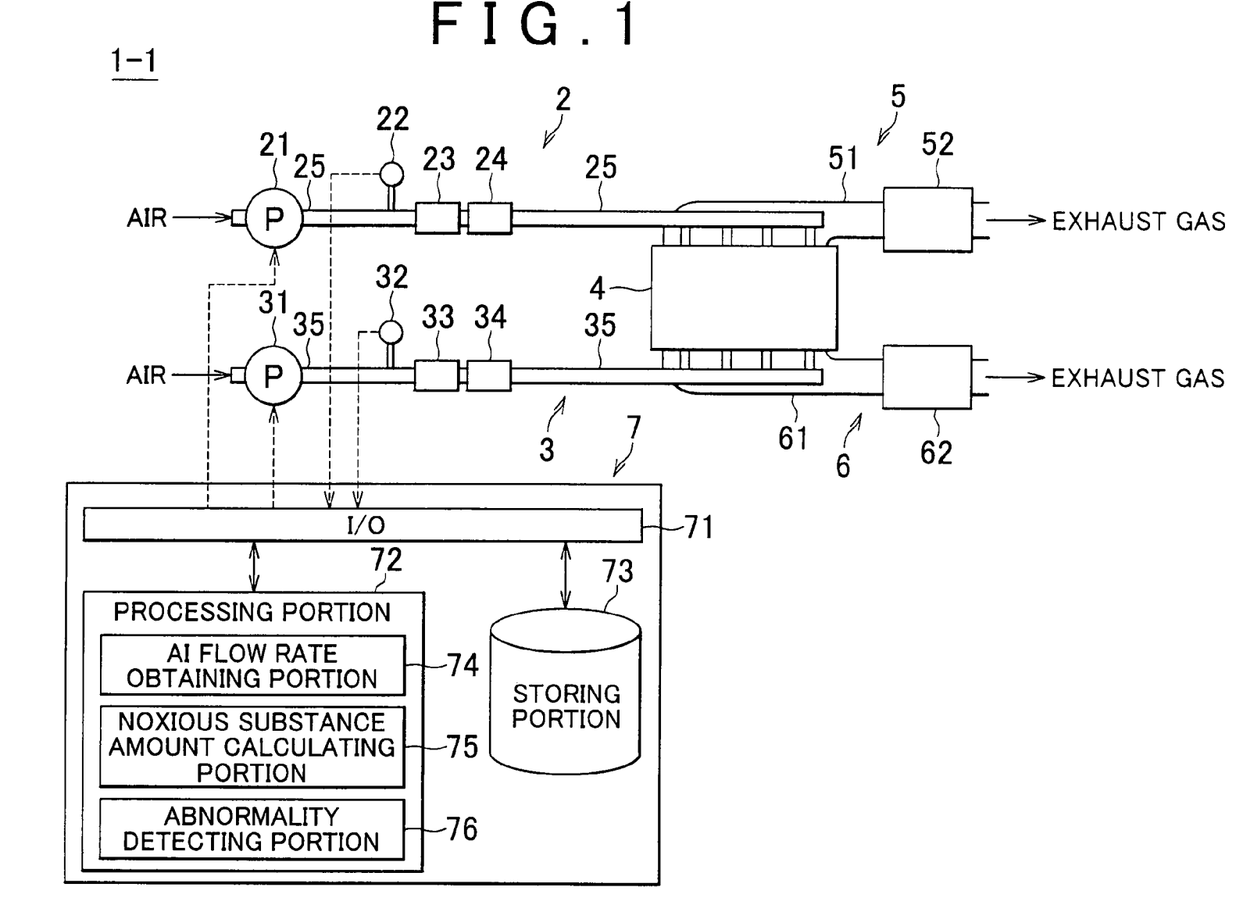
FIG. 1 is a schematic diagram of an example structure of a secondary air supply system according to a first example embodiment of the invention.

FIG. 1 is a schematic diagram of an example structure of a secondary air supply system according to a first example embodiment of the invention. As shown in the drawing, a secondary air supply system 1-1 according to this first example embodiment supplies secondary air to each exhaust passage 5 and 6 of an internal combustion engine 4. This secondary air supply system 1-1 has two secondary air supply portions 2 and 3 and a control apparatus 7. Here, the internal combustion engine 4 is a V8 gasoline engine having two groups of cylinders, not shown, with four cylinders to a group and one of the exhaust passages 5 and 6 provided independently for each cylinder group. Also, each of the exhaust passages 5 and 6 include, in order from the internal combustion engine side, an exhaust manifold 51 and 61, an exhaust gas control apparatus 52 and 62, an exhaust pipe, not shown, and a muffling device, also not shown. The internal combustion engine 4 is not limited to a V8 gasoline engine, but may be any type of internal combustion engine as long as it has a plurality of cylinder groups made up of at least one or more cylinders and an independent exhaust passage provided for each cylinder group.

The secondary air supply portion 2 is arranged on the upstream side of the exhaust gas control apparatus 52 provided in the exhaust passage 5. In this case, the secondary air supply portion 2 supplies secondary air to the exhaust manifold 51. Also, the secondary air supply portion 3 is arranged on the upstream side of the exhaust gas control apparatus 62 provided in the exhaust passage 6. In this case, the secondary air supply portion 3 supplies secondary air to the exhaust manifold 61. The secondary air supply portions 2 and 3 each include a secondary air supply pump 21 and 31, a pressure sensor 22 and 32, an ASV (air switching valve) 23 and 33, and a reed valve 24 and 34.

The secondary air supply pump 21 and 31 are provided midway in the secondary air supply lines 25 and 35, respectively. These secondary air supply pumps 21 and 31 draw in air, pressurize it, and then discharge it to the secondary air supply lines 25 and 35 on the exhaust manifold side. The secondary air supply pumps 21 and 31 are both driven in response to pump drive signals output from the control apparatus 7.

The pressure sensors 22 and 32 are provided in the secondary air supply lines 25 and 35 on the downstream side of the secondary air supply pumps 21 and 31, respectively. These pressure sensors 22 and 32 detect the pressures p1 and p2 in the secondary air supply lines 25 and 35. The pressures p1 and p2 in the secondary air supply lines 25 and 35 detected by these pressure sensors 22 and 32 are then output to the control apparatus 7.

The ASVs 23 and 33 are provided in the secondary air supply lines 25 and 35 on the downstream side of the secondary air supply pumps 21 and 31, respectively. These ASVs 23 and 33 open when negative pressure generated in an intake passage, not shown, of the internal combustion engine 4 is introduced. This negative pressure is introduced by a negative pressure introduction valve, not shown, which is controlled open and closed in response to a negative pressure introduction signal output from the control apparatus 7. Accordingly, the ASVs 23 and 33 are controlled open and closed by the control apparatus 7.

The reed valves 24 and 34 are provided in the secondary air supply lines 25 and 35 on the downstream side of the secondary air supply pumps 21 and 31, respectively. These reed valves 24 and 34 allow air to only flow from the secondary air supply pump side to the exhaust manifold side. This prevents exhaust gas that is discharged from the internal combustion engine 4 from flowing outside the internal combustion engine via the secondary air supply portions 2 and 3 from the exhaust manifolds 51 and 61.

One end portion of each of the secondary air supply lines 25 and 35 is communicated with the exhaust manifold 5 and 6, while the other end portion of each of the secondary air supply lines 25 and 35 is communicated with the outside of the internal combustion engine 4 or an intake passage, not shown, of the internal combustion engine 4 via an air filter, also not shown. That is, the secondary air supply system 1-1 supplies air from outside the internal combustion engine 4 to each of the exhaust passages 5 and 6.

The control apparatus 7 controls the supply of secondary air to the exhaust passages 5 and 6 of the internal combustion engine 4 by the secondary air supply system 1-1. The control apparatus 7 also detects any abnormalities in the secondary air supply system 1-1. Therefore, the control apparatus 7 functions as a secondary air flow rate obtaining device that obtains the secondary air flow rate, a noxious substance amount calculating device that calculates the amount of noxious substances, and an abnormality detecting device that detects an abnormality. This control apparatus 7 receives input signals such as signals indicative of the pressures p1 and p2 in the secondary air supply lines 25 and 35 detected by the pressure sensors 22 and 32 of the secondary air supply portions 2 and 3. Also, the control apparatus 7 outputs output signals such as the pump driving signals that dictate drive control of the secondary air supply pumps 21 and 31, and the negative pressure introduction signals that dictate opening and closing control of the negative pressure introduction valves, not shown. The control apparatus 7 also detects abnormalities based on the input signals.

More specifically, the control apparatus includes an input/output portion (I/O) 71 which inputs and outputs the input signals and output signals, a processing portion 72, and a storing portion 73. The processing portion 72 includes an AI flow rate obtaining portion 74 which serves as the secondary air flow rate obtaining device, a noxious substance amount calculating portion 75 which serves as the noxious substance amount calculating device, and an abnormality detecting portion 76 which serves as the abnormality detecting device. Also, the processing portion 72 includes memory and a CPU (Central Processing Unit) and may implement an abnormality detection method for the secondary air supply system 1-1 by loading a program based on the abnormality detection method or the like of the secondary air supply system 1-1 and executing that program. In the storing portion 73 is stored, for example, a map of the secondary air flow rate (hereinafter simply referred to as "AI flow rate") and the noxious substance amount, and a map of the AI flow rate and the average pressure in the secondary air supply line. The storing portion 73 can also include nonvolatile memory such as flash memory, nonvolatile memory that can only read such as ROM (Read Only Memory), or volatile memory that can both read and write such as RAM (Random Access Memory), or a combination of those. The control apparatus 7 does not need to be formed separately. Rather, an ECU (Electronic Control Unit) that controls operation of the internal combustion engine 4 may also function as the secondary air flow rate obtaining device, the noxious substance amount calculating device, and the abnormality detecting device.

Figure 2:
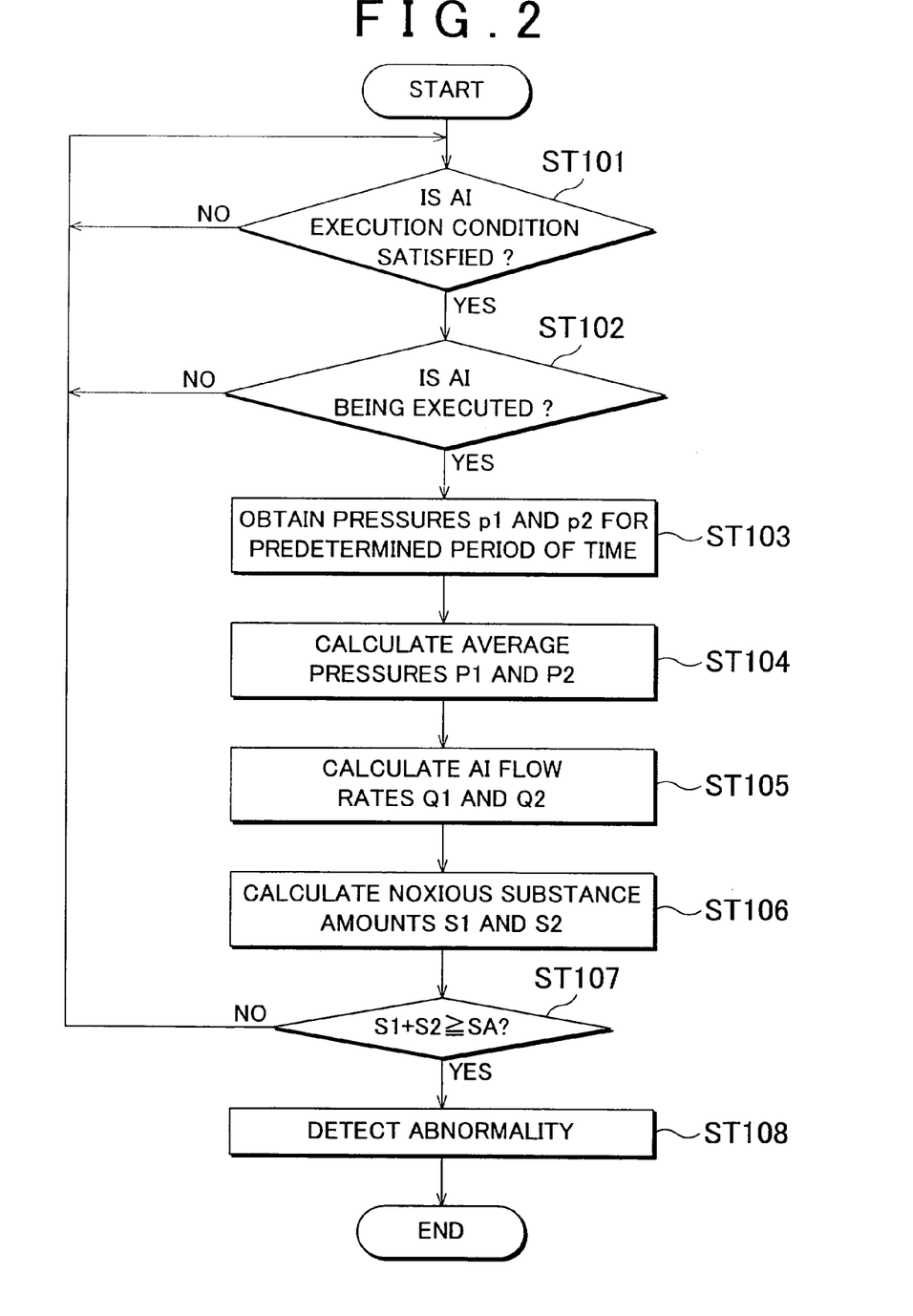
FIG. 2 is a flowchart illustrating a routine of an abnormality detection method for the secondary air supply system according to the first example embodiment.
Figure 3:
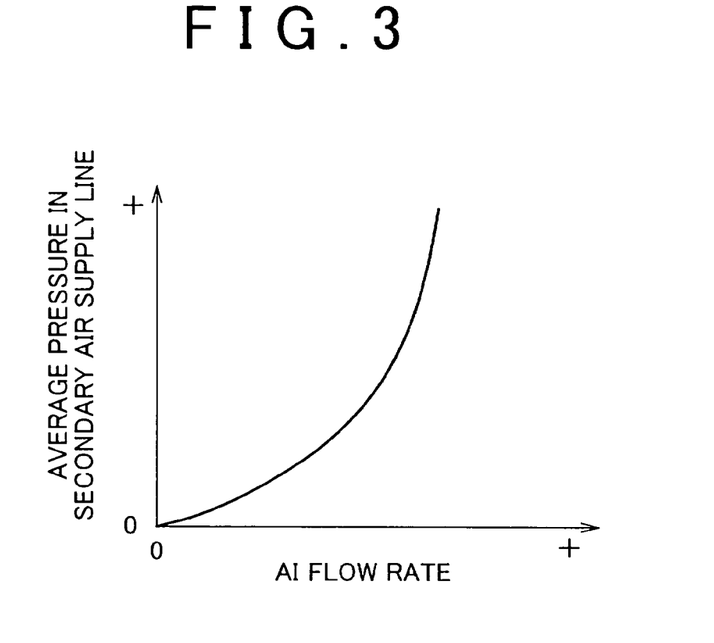
FIG. 3 is a graph showing the relationship between an AI flow rate and average pressure in secondary air supply line.
Figure 4:
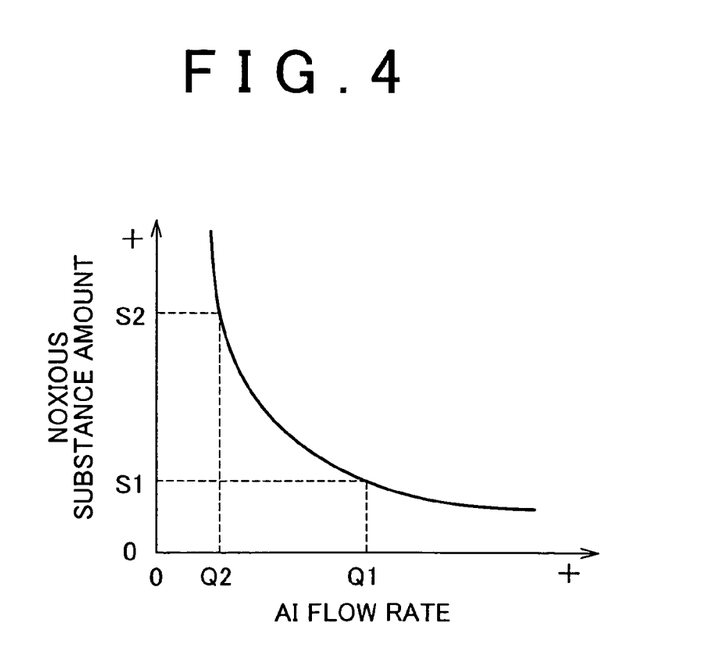
FIG. 4 is a graph showing the relationship between the AI flow rate and amount of noxious substances.

Next, a secondary air supply control method for the secondary air supply system 1-1 of the first example embodiment, and more particularly, an abnormality detection method for the secondary air supply system 1-1 will now be described. FIG. 2 is a flowchart illustrating a routine of the abnormality detection method for the secondary air supply system according to the first example embodiment. Also, FIG. 3 is a graph showing a map of the AI flow rate and the average pressure in the secondary air supply line, and FIG. 4 is a graph showing the relationship between the AI flow rate and the noxious substance amount. The processing portion 72 of the control apparatus 7 first determines whether secondary air supply control is being executed, i.e., whether an AI execution condition is satisfied (step ST101). Here, the processing portion 72 determines whether the AI execution condition is satisfied based on the engine load, engine speed, battery voltage, time passed after startup, intake air temperature, coolant temperature, and the like which are output to the control apparatus 7 from the ECU, not shown.

If it is determined that the AI execution condition is satisfied, the processing portion 72 of the control apparatus 7 next determines whether secondary air is being supplied, i.e., whether AI is currently being executed (step ST102). That is, the processing portion 72 determines whether air from outside the internal combustion engine 4 is being supplied to the exhaust passages 5 and 6 from the secondary air supply portions 2 and 3 based on whether the control apparatus 7 is driving the secondary air supply pumps 21 and 31 and the ASVs 23 and 33 are open. If it is determined that the AI execution condition is not satisfied, the processing portion 72 continues to determine whether the AI execution condition is satisfied by repeating step ST101 until the AI execution condition is satisfied.

If the processing portion 72 determines that AI is currently being executed, then the AI flow rate obtaining portion 74 of the processing portion 72 obtains the pressures p1 and p2 in the secondary air supply lines 25 and 35 for a predetermined period of time (step ST103). The predetermined period of time in this case refers to at least the period of time during which a pressure fluctuation in the secondary air supply lines 25 and 35 produced by the pump pulsations of the secondary air supply pumps 21 and 31 can be obtained. That is, the AI flow rate obtaining portion 74 continues to obtain the pressures p1 and p2 in the secondary air supply lines 25 and 35 that are detected by the pressure sensors 22 and 32, respectively. If it is determined that AI is not currently being executed, then the processing portion 72 returns to step ST101 in FIG. 2 and again determines whether the AI execution condition is satisfied.

Next, The AI flow rate obtaining portion 74 of the processing portion 72 calculates average pressures P1 and P2 in the secondary air supply lines 25 and 36 from the pressures p1 and p2 in the secondary air supply lines 25 and 35 that have continued to be obtained for the predetermined period of time (step ST104). Setting the obtained pressures p1 and p2 to the average pressures P1 and P2, respectively, suppresses the effect that the pump pulsation of the secondary air supply pumps 21 and 31 has on the AI flow rates Q1 and Q2 calculated from the pressures.

Next, the AI flow rate obtaining portion 74 of the processing portion 72 calculates the secondary air flow rate supplied to each of the exhaust passages 5 and 6 from the secondary air supply portions 2 and 3, i.e., the AI flow rates Q1 and Q2 (step ST105). The AI flow rates Q1 and Q2 increase on a quadratic curve, i.e., increase more noticeably than in the case of a proportional increase, as the pump discharge pressures of the secondary air supply pumps 21 and 31, i.e., the pressures p1 and p2 in the secondary air supply lines 25 and 35, increase. Here, the AI flow rate obtaining portion 74 calculates the AI flow rates Q1 and Q2 from the calculated average pressures P1 and P2 in the secondary air supply lines 25 and 35, and a map of the average pressure in the secondary air supply line and the AI flow rate which is shown in FIG. 3 based on the relationship between the pump discharge pressure and the AI flow rates Q1 and Q2. Accordingly, the AI flow rate obtaining portion 74 obtains the AI flow rates Q1 and Q2 supplied to the exhaust passages 5 and 6.

Next, the noxious substance calculating portion 75 of the processing portion 72 calculates noxious substance amounts S1 and S2 in the exhaust gas discharged from the exhaust passages 5 and 6 (step ST106). As shown in FIG. 4, the noxious substance amounts S1 and S2 increase on a quadratic curve, i.e., increase more noticeably than in the case of a proportional increase, as the secondary air flow rate supplied to the exhaust passages 5 and 6 from the secondary air supply portions 2 and 3, i.e., the AI flow rates, decrease. In this case, the noxious substance calculating portion 75 calculates the noxious substance amounts S1 and S2 from the calculated AI flow rates Q1 and Q2 and a map of the noxious substance amount and these AI flow rates which is shown in FIG. 4.

Next, the abnormality detecting portion 76 of the processing portion 72 determines whether the total noxious substance amount of the combined noxious substance amounts S1 and S2 that were calculated is equal to or greater than a predetermined total noxious substance amount SA (step ST107). Here, the predetermined total noxious substance amount SA refers to the total amount of noxious substances in the exhaust gas discharged from the exhaust passages 5 and 6, which determines that there is an abnormality in the secondary air supply system 1-1 when at least one of the AI flow rates Q1 and Q2 of the secondary air supply portions 2 and 3 decreases due to the secondary air supply lines that introduce secondary air into the exhaust manifolds 51 and 61 becoming clogged or the secondary air supply pumps 21 and 31 that supply secondary air to the exhaust manifolds 51 and 61 via these secondary air supply lines failing, for example.

Then, if it is determined that the total noxious substance amount of the combined noxious substance amounts S1 and S2 that were calculated is equal to or greater than the predetermined total noxious substance amount SA, the abnormality detecting portion 76 of the processing portion 72 detects an abnormality in the secondary air supply system 1-1 (step ST108). In this case, when the control apparatus 7 detects an abnormality in the secondary air supply system 1-1, the abnormality may be displayed, a warning sound may be produced, and a record of that abnormality detection may be stored in the storing portion 73, in the vehicle in which the internal combustion engine 4 is mounted, for example. If, on the other hand, it is determined that the total noxious substance amount of the combined noxious substance amounts S1 and S2 that were calculated is less than the predetermined total noxious substance amount SA, then the abnormality detecting portion 76 returns to step ST101 in FIG. 2 and again determines whether the AI execution condition is satisfied.

In this way, in the secondary air supply system 1-1 according to this first example embodiment, the noxious substance amounts S1 and S2 in the exhaust gas discharged from the exhaust passages 5 and 6 are calculated from the secondary air amounts Q1 and Q2 supplied to the exhaust passages 5 and 6, and an abnormality in the secondary air supply system 1-1 is then detected based on the total noxious substance amount of the combined calculated noxious substance amounts S1 and S2. As a result, an abnormality in the secondary air supply system 1-1 can be detected more accurately than it can be when abnormality detection is based on the total flow rate of the combined secondary air flow rates Q1 and Q2 supplied to the exhaust passages 5 and 6 because the change in the noxious substance amounts in the exhaust gas discharged from the internal combustion engine 4 can be accurately estimated.

Figure 5:
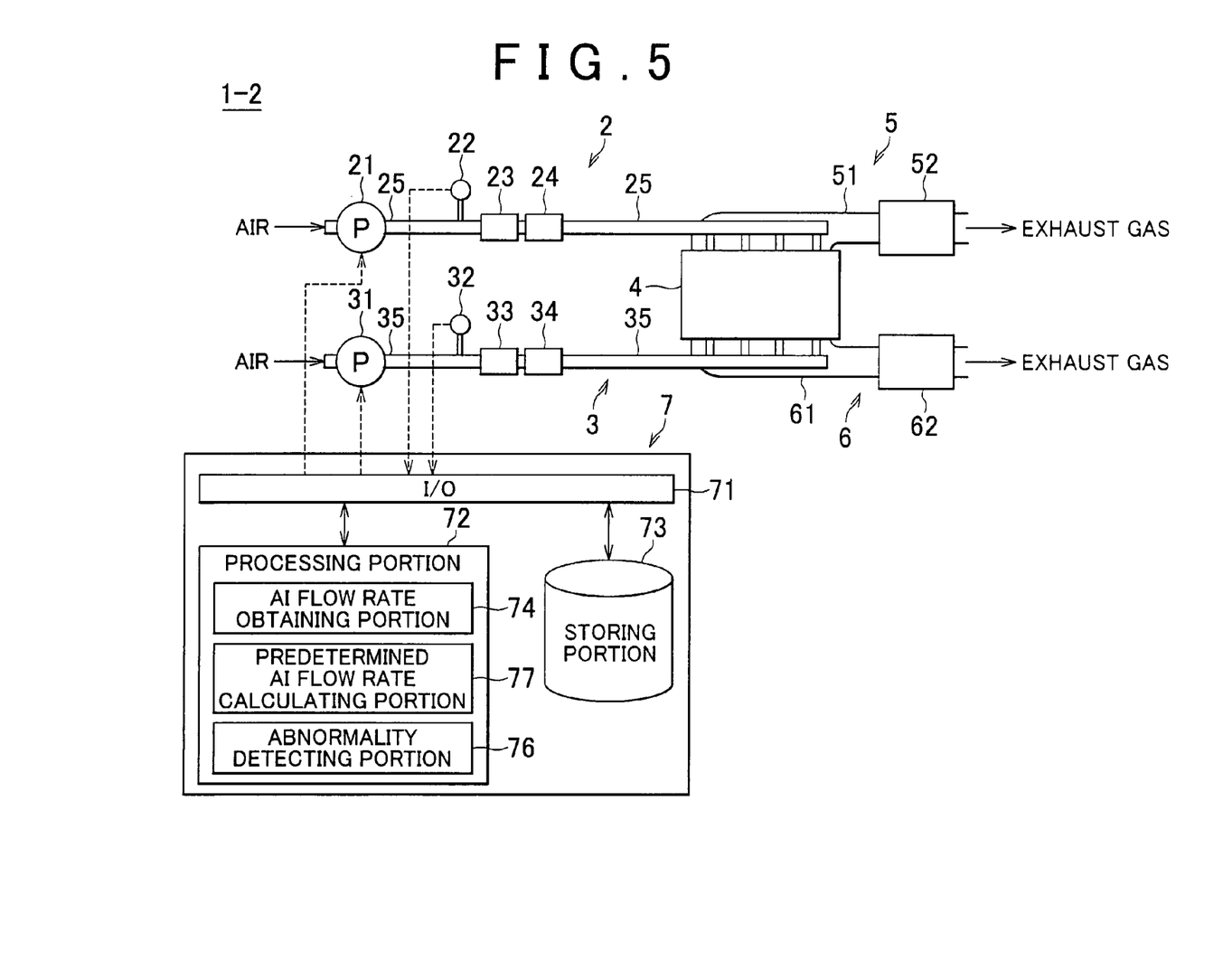
FIG. 5 is a schematic diagram of an example structure of a secondary air supply system according to a second example embodiment of the invention.

FIG. 5 is a schematic diagram of an example structure of a secondary air supply system according to a second example embodiment. The secondary air supply system 1-2 shown in FIG. 5 differs from the secondary air supply system 1-1 shown in FIG. 1 in that the control apparatus 7 is provided with a predetermined AI flow rate calculating portion 77 instead of the noxious substance amount calculating portion 75. More specifically, in the secondary air supply system 1-2 shown in FIG. 5, another predetermined secondary air flow rate in which the total noxious substance amount of the combined noxious substance amounts in the exhaust gas discharged from the exhaust passages 5 and 6 becomes a predetermined total noxious substance amount, is calculated based on one of the obtained secondary air flow rates, and this other predetermined secondary flow rate is compared with the other secondary flow rate that was obtained. The other basic structure of the secondary air supply system 1-2 shown in FIG. 5 is similar to that of the secondary air supply system 1-1 shown in FIG. 1 so a description thereof will be omitted.

As shown in FIG. 5, the control apparatus 7 functions as a secondary air flow rate obtaining device that obtains a secondary air flow rate, a predetermined secondary air flow rate calculating device which calculates, from one of the secondary air flow rates, another secondary air flow rate in which the total noxious substance amount becomes a predetermined total noxious substance amount, and an abnormality detecting device which detects an abnormality. Accordingly, the processing portion 72 includes an AI flow rate obtaining portion 74 which serves as the secondary air flow rate obtaining device, an abnormality detecting portion 76 which serves as the abnormality detecting device, and the predetermined AI flow rate calculating portion 77 which serves as the predetermined AI flow rate calculating device. Also, the storing portion 73 stores a map of one AI flow rate and the other AI flow rate, and the like.

Figure 6:
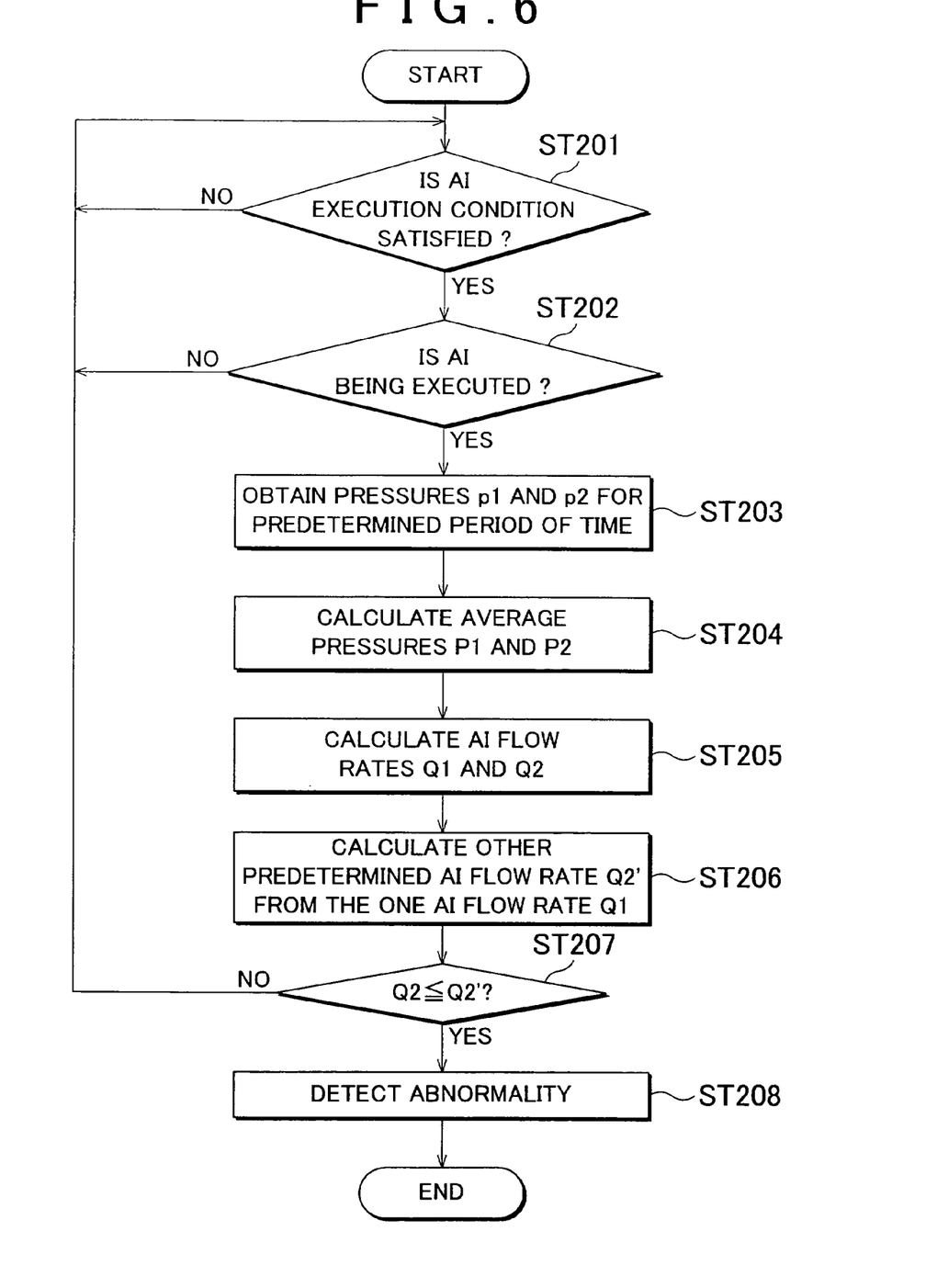
FIG. 6 is a flowchart illustrating a routine of an abnormality detection method for the secondary air supply system according to the second example embodiment.
Figure 7:
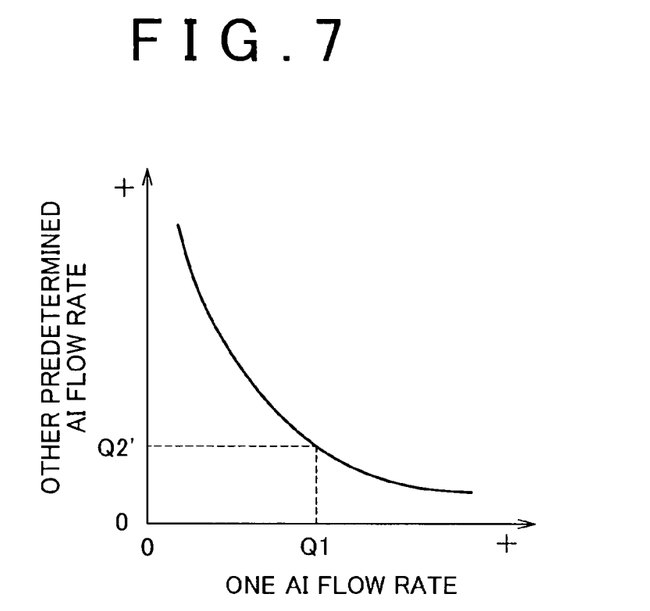
FIG. 7 is a graph showing the relationship between one AI flow rate and another predetermined AI flow rate.

Here, a secondary air supply control method for the secondary air supply system 1-2 of the second example embodiment, and more particularly, an abnormality detection method for the secondary air supply system 1-2 will now be described. FIG. 6 is a flowchart illustrating a routine of the abnormality detection method for the secondary air supply system according to the second example embodiment, and FIG. 7 is a graph of one AI flow rate and the other predetermined AI flow rate. Descriptions of the steps in the abnormality detection method for the secondary air supply system 1-2 shown in FIG. 6 which are the same as steps in the abnormality detection method for the secondary air supply system 1-1 shown in FIG. 2 will be simplified here.

The processing portion 72 of the control apparatus 7 first determines whether secondary air supply control is being executed, i.e., whether an AI execution condition is satisfied (step ST201). If it is determined that the AI execution condition is satisfied, the processing portion 72 of the control apparatus 7 next determines whether secondary air is being supplied, i.e., whether AI is currently being executed (step ST202). If, on the other hand, it is determined that the AI execution condition is not satisfied, the processing portion 72 continues to determine whether the AI execution condition is satisfied by repeating step ST201 until the AI execution condition is satisfied.

Next, if the processing portion 72 determines that AI is currently being executed, then the AI flow rate obtaining portion 74 of the processing portion 72 obtains pressures p1 and p2 in the secondary air supply lines 25 and 35 for a predetermined period of time (step ST203). If, on the other hand, it is determined that AI is not currently being executed, then the processing portion 72 returns to step ST201 in FIG. 6 and again determines whether the AI execution condition is satisfied. Next, the AI flow rate obtaining portion 74 calculates average pressures P1 and P2 in the secondary air supply lines 25 and 36 from the pressures p1 and p2 in the secondary air supply lines 25 and 35 that have continued to be obtained for the predetermined period of time (step ST204).

Next, the AI flow rate obtaining portion 74 of the processing portion 72 calculates the secondary air flow rate supplied to each exhaust passage 5 and 6 from the secondary air supply portions 2 and 3, i.e., calculates the AI flow rates Q1 and Q2 (step ST205). Here, the AI flow rate obtaining portion 74 calculates, i.e., obtains, AI flow rates Q1 and Q2 from the calculated average pressures P1 and P2 in the secondary air supply lines 25 and 35, and a map of the average pressure in the secondary air supply line and the AI flow rate, which is shown in FIG. 3.

Next, the predetermined AI flow rate calculating portion 77 of the processing portion 72 calculates another predetermined AI flow rate (Q2' in this example embodiment) from one (in this case Q1) of the AI flow rates Q1 and Q2 that were calculated (step ST206). Here, the predetermined AI flow rate calculating portion 77 calculates the other predetermined AI flow rate Q2' from the calculated AI flow rate Q1 and a map of this one AI flow rate and the other predetermined AI flow rate shown in FIG. 7. This map is set such that the total noxious substance amount of the combined noxious substance amounts in the exhaust gas discharged from the exhaust passages 5 and 6 becomes a predetermined total noxious substance amount. This predetermined total noxious substance amount is the total amount of noxious substances in the exhaust gas discharged from the exhaust passage 5 and 6 that determines that there is an abnormality in the secondary air supply system 1-2 when at least one of the AI flow rates Q1 and Q2 of the secondary air supply portions 2 and 3 decreases, similar to the first example embodiment described above.

Next, the abnormality detecting portion 76 of the processing portion 72 determines whether the obtained AI flow rate Q2 is equal to or less than the predetermined AI flow rate Q2' that was calculated (step ST207). That is, the abnormality detecting portion 76 of the processing portion 72 determines whether the obtained other AI flow rate Q2 is equal to or less than the predetermined AI flow rate Q2' in which the total noxious substance amount of the combined noxious substance amounts in the exhaust gas discharged from the exhaust passages 5 and 6 becomes the predetermined total noxious substance amount.

If it is determined that the other AI flow rate Q2 that was obtained is equal to or less than the other predetermined AI flow rate Q2', then the abnormality detecting portion 76 of the processing portion 72 detects an abnormality in the secondary air supply system 1-2 (step ST208). If the abnormality detecting portion 76 determines that the other AI flow rate Q2 that was obtained exceeds the other predetermined AI flow rate Q2', however, the processing portion 72 returns to step ST201 in FIG. 6 and again determines whether the AI execution condition is satisfied.

In this way, in the secondary air supply system 1-2 according to this second example embodiment, an abnormality in the secondary air supply system 1-2 is detected based on the other predetermined secondary air flow rate Q2' that was calculated from one (in this case Q1) of the two secondary air flow rates Q1 and Q2 supplied to the exhaust passages 5 and 6 when the total noxious substance amount, which is the combined noxious substance amounts in the exhaust gas discharged from the exhaust passages 5 and 6, is made the predetermined total noxious substance amount. As a result, an abnormality in the secondary air supply system 1-2 can be detected more accurately than it can be when abnormality detection is based on the total flow rate of the combined secondary air flow rates Q1 and Q2 supplied to the exhaust passages 5 and 6 because the change in the noxious substance amounts in the exhaust gas discharged from the internal combustion engine 4 can be accurately estimated.

The secondary air supply systems 1-1 and 1-2 according to the first and second example embodiments only detect an abnormality, but the invention is not limited to this. For example, the secondary air supply system 1-1 and 1-2 may be provided with a flow rate changing device that changes the secondary air flow rate supplied to each of the exhaust passages 5 and 6, and this flow rate changing device may increase the secondary air flow rate supplied to at least one of the exhaust passages 5 and 6 when an abnormality is detected. In this case, the structure is such that output from the secondary air supply pumps 21 and 31 of the secondary air supply portions 2 and 3 changes in response to pump drive signals output from the control apparatus 7 such that when the abnormality detecting portion 76 detects an abnormality in the secondary air supply systems 1-1 and 1-2, the output from at least one of the secondary air supply pumps 21 and 31 is increased to increase the secondary air flow rate supplied to at least one of the exhaust passages 5 and 6.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A secondary air supply system which supplies secondary air to an upstream side of an exhaust gas control apparatus, comprising:
    a plurality of exhaust passages, each exhaust passage being provided independently for each of a plurality of cylinder groups made up of at least one cylinder;
    a secondary air flow rate obtaining device which obtains a secondary air flow rate of the secondary air supplied to each of the exhaust passages;
    a noxious substance amount calculating device which calculates a noxious substance amount in exhaust gas discharged from each of the exhaust passages according to each obtained secondary air flow rate; and
    an abnormality detecting device which detects an abnormality in the secondary air supply system when a total noxious substance amount that is the sum of the calculated noxious substance amounts is equal to or greater than a predetermined total noxious substance amount.

2. The secondary air supply system according to claim 1, further comprising:
    a flow rate changing device that changes the secondary air flow rate supplied to each of the exhaust passages,
    wherein the flow rate changing device increases the secondary air flow rate supplied to at least one of the exhaust passages when an abnormality is detected in the secondary air supply system.

3. A secondary air supply system which supplies secondary air to an upstream side of an exhaust gas control apparatus, comprising:
    a plurality of exhaust passages, each exhaust passage being provided independently for each of a plurality of cylinder groups made up of at least one cylinder;
    a secondary air flow rate obtaining device which obtains a secondary air flow rate of the secondary air supplied to each of the exhaust passages;
    a predetermined secondary air flow rate calculating device which calculates, based on one of the obtained secondary air flow rates, the other predetermined secondary air flow rate in which a total noxious substance amount that is a sum of noxious substance amounts in exhaust gas discharged from the exhaust passages becomes a predetermined total noxious substance amount; and
    an abnormality detecting device which detects an abnormality in the secondary air supply system when the other secondary air flow rate that was obtained is equal to or less than the other predetermined secondary air flow rate that was calculated.

4. The secondary air supply system according to claim 3, further comprising:
    a flow rate changing device that changes the secondary air flow rate supplied to each of the exhaust passages,
    wherein the flow rate changing device increases the secondary air flow rate supplied to at least one of the exhaust passages when an abnormality is detected in the secondary air supply system.

5. An abnormality detection method for a secondary air supply system which supplies secondary air to an upstream side of an exhaust gas control apparatus, comprising the steps of:
    obtaining a secondary air flow rate of secondary air supplied to each of a plurality of exhaust passages, each exhaust passage being provided independently for each of a plurality of cylinder groups made up of at least one cylinder;
    calculating a noxious substance amount in exhaust gas discharged from each of the exhaust passages according to each obtained secondary air flow rate; and
    detecting an abnormality when a total noxious substance amount that is a sum of the calculated noxious substance amounts is equal to or greater than a predetermined total noxious substance amount.

6. The abnormality detection method for a secondary air supply system according to claim 5, further comprising the step of:
    increasing the secondary air flow rate supplied to at least one of the exhaust passages when an abnormality is detected in the secondary air supply system.

7. An abnormality detection method for a secondary air supply system which supplies secondary air to an upstream side of an exhaust gas control apparatus, comprising the steps of:
    obtaining a secondary air flow rate of secondary air supplied to each of a plurality of exhaust passages, each exhaust passage being provided independently for each of a plurality of cylinder groups made up of at least one cylinder;
    calculating, based on one of the obtained secondary air flow rates, the other predetermined secondary air flow rate in which a total noxious substance amount that is a sum of noxious substance amounts in exhaust gas discharged from the exhaust passages becomes a predetermined total noxious substance amount; and
    detecting an abnormality when the other secondary air flow rate that was obtained is equal to or less than the other predetermined secondary air flow rate that was calculated.

8. The abnormality detection method for a secondary air supply system according to claim 7, further comprising the step of:
    increasing the secondary air flow rate supplied to at least one of the exhaust passages when an abnormality is detected in the secondary air supply system.

* * * * *